US010788810B2

(12) United States Patent
Hörburger

(10) Patent No.: US 10,788,810 B2
(45) Date of Patent: Sep. 29, 2020

(54) METHOD FOR THE AUTOMATIC DETERMINATION OF THE GEOMETRICAL DIMENSIONS OF A TOOL HAVING A MACHINING REGION IN WORM THREAD FORM

(71) Applicant: Liebherr-Verzahntechnik GmbH, Kempten (DE)

(72) Inventor: Josef Hörburger, Waltenhofen (DE)

(73) Assignee: LIEBHERR-VERZAHNTECHNIK GMBHOF SCIENCES, Kempten (DE)

(*) Notice: Subject to any disclaimer, the term of this patent is extended or adjusted under 35 U.S.C. 154(b) by 216 days.

(21) Appl. No.: 16/130,686

(22) Filed: Sep. 13, 2018

(65) Prior Publication Data
US 2019/0079494 A1    Mar. 14, 2019

(30) Foreign Application Priority Data

Sep. 14, 2017    (DE) .................. 10 2017 121 344

(51) Int. Cl.
| | |
|---|---|
| *G01B 5/16* | (2006.01) |
| *G05B 19/4093* | (2006.01) |
| *G01B 5/20* | (2006.01) |
| *G01B 11/24* | (2006.01) |
| *G01B 21/02* | (2006.01) |
| *G05B 19/18* | (2006.01) |
| *G05B 19/4065* | (2006.01) |

(52) U.S. Cl.
CPC ....... *G05B 19/40938* (2013.01); *G01B 5/163* (2013.01); *G01B 5/204* (2013.01); *G01B 11/2425* (2013.01); *G01B 21/02* (2013.01); *G05B 19/182* (2013.01); *G05B 19/4065* (2013.01)

(58) Field of Classification Search
CPC .................................. G01B 5/16; G01B 5/163
USPC ........................................... 33/501.7–501.19
See application file for complete search history.

(56) References Cited

U.S. PATENT DOCUMENTS

| | | | | | |
|---|---|---|---|---|---|
| 2,821,785 | A | * | 2/1958 | Lekas ...................... | G01B 7/28 33/501.9 |
| 3,686,763 | A | * | 8/1972 | Soe ......................... | B43L 13/00 33/19.2 |
| 3,816,926 | A | * | 6/1974 | Gfeller ..................... | G01B 3/12 33/772 |
| 4,519,242 | A | * | 5/1985 | Hofler ..................... | G01B 5/202 33/501.9 |
| 4,590,678 | A | * | 5/1986 | Arredondo ............. | G01B 5/163 33/199 R |
| 5,689,993 | A | * | 11/1997 | Matsumoto ......... | G01M 13/021 33/501.19 |

(Continued)

FOREIGN PATENT DOCUMENTS

DE          19910747 B4      3/2012

*Primary Examiner* — George B Bennett
(74) *Attorney, Agent, or Firm* — McCoy Russell LLP

(57) ABSTRACT

The present disclosure relates to a method for the automatic determination of the geometrical dimensions of a tool having a machining region in worm thread form, in particular of a grinding worm, wherein in the method: a measurement element is directed to the tool for the detection of a distance, the tool is set into rotation with respect to the measurement element, and a conclusion is drawn on the geometry of the tool on the basis of distance values that were detected by the measurement element during the rotation of the tool.

17 Claims, 5 Drawing Sheets

(56) References Cited

U.S. PATENT DOCUMENTS

| | | | |
|---|---|---|---|
| 8,984,760 B1* | 3/2015 | Thompson | G01B 3/50 33/501.08 |
| 2015/0285610 A1* | 10/2015 | Knabel | G01B 5/24 33/501.14 |
| 2019/0339053 A1* | 11/2019 | Hughey | G01B 5/003 |

* cited by examiner

METHOD FOR THE AUTOMATIC DETERMINATION OF THE GEOMETRICAL DIMENSIONS OF A TOOL HAVING A MACHINING REGION IN WORM THREAD FORM

CROSS REFERENCE TO RELATED APPLICATION

This application claims priority to German Patent Application No. 10 2017 121 344.9 entitled "METHOD FOR THE AUTOMATIC DETERMINATION OF THE GEOMETRICAL DIMENSIONS OF A TOOL HAVING A MACHINING REGION IN WORM THREAD FORM," filed on Sep. 14, 2017, the entire contents of which is hereby incorporated by reference in its entirety for all purposes.

TECHNICAL FIELD

The present disclosure relates to a method for determining the geometry of a tool having a machining region in worm thread form, in particular of a grinding worm. Such tools are typically used in a gear cutting machine for gear cutting workpieces. It is important for the quality of the gearing to know the geometrical parameters of the tool and to be able to determine them without worksteps to be performed by hand.

BACKGROUND AND SUMMARY

A multistage setting up process is required as a rule in the setting up of a gear cutting machine for machining rough cut workpieces. The geometrical dimensions of the tool first have to be manually determined outside the gear cutting machine or can also be taken from tool data sheets. These data subsequently have to be stored in the machine control. Some of these geometrical data change over time in dressable tools, e.g. due to a preceding dressing procedure. It is possible that the worm diameter changes, for example, so that it has to be subjected to an additional modification to avoid profile errors. This also applies to the lead or to the pressure angle of a grinding worm.

It has accordingly previously been necessary to protocol these data over the time of use of the grinding worm in a traceable manner so that they are available again on a repeat exchange of the tool.

In a further step in the setting up process, the location of the tool threads relative to the rotational position of the tool axis has to be stored in the control. This information and the position of the workpiece tooth spaces relative to the rotational position of the workpiece axis are required to be able to carry out an error-free, gear-coupled gear machining process. These further process steps are frequently called meshing.

To date, some of this total process is disadvantageously carried out manually or only semi-automatically despite the already highly automated gear cutting processes. The operator has thus previously had to position the tool relative to the tooth space of a workpiece during the first meshing after the substantially manual input of the geometrical parameters of the tool. For this purpose, the tool is manually rotated about its axis of rotation for so long until the teeth of the tool can dip into the tooth spaces without collision. The tool is subsequently fed in and a respective contact is established between the left and right tooth flanks of the tool by shifting or rotating the tool and the measured value for this is recorded. The center tooth position of the tool relative to the tooth space can be calculated from these contact dimensions and the rotational position of the tool relative to the tooth space can be calculated from it and the rotational position of the tool at which it can dip into a known tooth space without collision can be calculated from that.

All these manual worksteps of the machine operator bring about disadvantages such as increased dressing times and, due to the manual operation, possibly occurring incorrect settings of the gear cutting machine.

Only the automatic detection of a pitch and of a number of threads of a tool having a machining region in worm thread form has previously been known from the prior art.

DE 199 10 747 B4, for example, discloses a method and an apparatus for meshing a dressing tool into the thread space of a grinding worm. It is described that the sensing of a dresser at a stationary grinding worm takes place along its longitudinal axis (that is, along the V1 axis) to determine a thread space or the spacing and the number of projecting tooth flanks for a later automated meshing.

The object of the present disclosure therefore comprises carrying out a fully automatic meshing of process-relevant geometrical parameters of the grinding worm that go beyond the geometrical parameters determined in the already known prior art. It is furthermore an object of the present disclosure to carry out the determination of the geometrical parameters as quickly as possible and with a high precision.

This object is achieved in accordance with the present disclosure by a method having the features of claim 1 or having the features of claim 10.

"Parameters" can be understood as different geometrical dimensions such as the outer diameter of a grinding worm, the worm width, the lead angle and lead direction, but also the number of threads of the grinding worm, pitch, etc. A "parameter" in the sense of the present disclosure can, however, also include other aspects.

In the method for the automatic determination of the geometrical dimensions of a tool having a machining region in worm thread form, in particular of a grinding worm, a measurement element for detecting a distance is directed toward the tool, the tool is set into rotation with respect to the measurement element, and a conclusion is drawn on the geometrical dimensions of the tool on the basis of distance values that were detected by the measurement element during the rotation of the tool.

The tool is rotated about the axis of rotation about which it is also rotated on a machining of a workpiece. The geometrical dimensions of the tool can be determined using the varying distances during such a rotation.

Provision may be made in accordance with the method to compare the detected distance values on a rigid arrangement of the tool along its axis of rotation (B1) and on a rotation of the tool by 360°, or 720°, with a specified threshold value. The number of threads of the tool is then determined on the basis of the distance values compared with the threshold value.

The number of threads results from the number of pulses that exceed the threshold value and correspond to a reduced distance value. The measurement can be checked in that the angular spacing between the teeth of the tool to be expected from the number of threads is compared with the measured angular spacings. If an irregularity is present, the measurement is repeated. For it is possible with this measurement that an addendum is not yet detected by the measurement unit at every point on the travel of the grinding worm (in parallel with the axis of rotation B1). A measurement unit in the form of a dresser whose contact with an addendum is detected by a change of sound is in particular prone to error.

Provision can be made to likewise set the dresser into rotation so that it generates a detectable impact sound when it hits against an addendum by the rotation of the tool. Provision can be made to reduce the spacing of the tool and dresser radially by 20 μm after one rotation to also obtain reliable pulses in the impact sound signal on a second revolution. Two revolutions are optionally measured to increase the likelihood of a correct detection.

This method works without a tool inwardly pivoted in accordance with the lead angle of the grinding worm since the sensing takes place on the jacket surface so that a use of the method can also be applied with a completely unknown grinding worm (tool). Care only has to be taken that the grinding worm only has one region.

The use of a laser for the detection of the number of threads would likewise be conceivable here.

In accordance with a further modification of the present disclosure, (a) the measurement element is positioned centrally with respect to a thread space of the tool; (b) the tool is set into rotation along the axis of rotation (B1) with a rigid arrangement and is stopped such that the measurement element arranged rigidly during the rotation is continuously oriented on a thread of the tool on with its distance measurement during the rotation that is carried out and does not leave said orientation; and (c) the measurement element is again positioned centrally to the thread width of the tool at this new position of the tool and determines the pitch direction of the thread of the tool on the basis of a shift of the two centers of the thread space before and after the rotation.

Provision can be made that the order of the method steps (a)-(c) has to be carried out in exactly the described time sequence.

The measurement element may be oriented substantially perpendicular to the axis of rotation (B1) of the tool during the course of the methods steps (a)-(c). This brings about advantages with respect to the accuracy of the distance measurement.

In accordance with a further development of the method in accordance with the present disclosure, the measurement element is directed to an addendum or to a tooth flank of the tool; the rotation of the tool takes place with gear coupling to the measurement element, for example in that the tool is moved accordingly in agreement with a lead angle of a thread of the tool tangentially along its axis of rotation (B1); and the state and/or a contour of the addendum or of the tooth flank is determined on the basis of the distance values detected by the measurement element; and a chip at the addendum or at the tooth flank is found at specific tangential positions and angular positions of the tool.

With a gear-coupled rotation with the measurement unit, the tool is simultaneously rotated and shifted along its longitudinal axis as if there were a rigid engagement with a thread of the tool during a rotation of the tool.

It can thus be the case on the setting up of a machine with a used grinding worm that the latter is damaged (e.g. by storage, transport, prior machining). In this case, the defective regions have to be taken into account or have to be eliminated by the dressing.

For the recognition of such defects, the addenda or also the tooth flanks can be traveled over with gear coupling with the measurement unit. A constant distance value is continuously produced with a non-damaged grinding worm. If, in contrast, there is a chip at one point, the measurement unit records a deviation from the constant distance value at this point. On an exceeding of a certain distance, it is possible to store the tangential positions and the angular positions of the tool. These positions then correspond to the starts and ends of defective regions of the tool.

The result is optionally checked in accordance with the method in accordance with the present disclosure on the determination of the geometry of the tool. This is done in that the measurement unit is aligned to a center of a thread of the tool, the tool is traveled over, optionally along its total length, while gear coupled to the measurement unit while taking account of the values to be checked, and the distance values detected during the travel and/or the position of the measurement unit after the travel with respect to the center of the thread of the tool enable a conclusion on the correctness of the results on the determination of the geometry of the tool.

Although the results of the measurements are already monitored during the measurement process, erroneous results can nevertheless be produced. For example, an incorrect measurement of the pitch is not recognized if exactly every second addendum is not detected. A complete check of the detected characteristics of the grinding worm is advantageous for this reason.

For this purpose, the tool, such as a grinding worm, is traveled over while gear coupled while taking account of the determined values. The grinding worm is inwardly pivoted by the lead angle that can be calculated from the determined values for this purpose and the Z1 axis is correspondingly readjusted. The measurement unit is now meshed into a thread of the tool. A thread of the grinding worm is travel over by the dresser with gear coupling in this position. The coupling factor can likewise result from values that were determined in a preceding process or was entered by a manual input. The distance from the measurement unit is monitored during the process. If the determined value with respect to the geometry of the tool are erroneous, a collision with a flank occurs on the check, which is recognized by the measurement unit. In response to this, there is a withdrawal of the grinding worm so that the latter is not damaged by the check (due to a possible collision with the measurement unit).

It would additionally also be possible to measure only at specific points in the thread space using the measurement unit. If this does not deliver the expected values, the previously determined values must be erroneous. It is possible to save time for the check using this method; however, the positions for the distance measurement have to be selected such that incorrect values are reliably recognized.

Provision may be made in accordance with the present disclosure that the measurement unit is realized by an optical measurement unit such as a laser distance measurement device, by an acoustic measurement unit such as a dresser having an impact sound device and/or by a physical measurement unit such as an evaluation of a following error of a dresser and/or an evaluation of motor parameters for driving a dresser such as current consumption, power consumption, or motor voltage.

A laser distance measurement device can be realized by means of a unit for laser triangulation that enables an exact determination of distance values from the tool.

An acoustic measurement unit such as can be realized by a dresser and an impact sound device recognizes changes in the sound as soon as a typically rotating dresser comes into contact with the tool. On an impact of the dresser on the tool, an impact sound is produced in the dresser and in the tool that signals a contact of the dresser with the tool. The geometry of the tool can thus be sensed.

Provision can furthermore be made that, on the realization of the measurement unit by a dresser having an impact sound device, the dresser, that is optionally a dressing wheel or a composite profile roller, generates a change in the impact sound detectable by the impact sound device when the dresser impacts the tool in a state rotating with respect to the tool so that a minimal distance from the dresser can be determined.

The following error can be used with the measurement unit that comprises a dresser that is optionally a dressing wheel or a composite profile roller to determine a minimal distance of the dresser and the tool since there is a delay of the dresser due to the friction on a coming together of the rotating dresser and the tool and since a difference can be detected in a comparison of the desired value and the actual value such that the contact of the dresser and the tool can be determined.

It is additionally possible that with a measurement unit that comprises a dresser that is optionally a dressing wheel or a composite profile roller, the detection of motor parameters of a drive for rotating the dresser or the tool is used to determine a minimal distance of the dresser and the tool since a friction is produced on a contact of the dresser and the tool and the additional load torque thereby produced is reflected in the motor parameters, in particular in a change in the current consumption, power consumption and/or motor voltage. The distance, or a contact of the dresser and the tool, can thus be determined by monitoring the corresponding motor parameters.

The present disclosure further comprises a method for the determination of the geometry of a tool comprising a machining region in worm thread form, in particular a grinding worm, wherein in the method a measurement element in the form of a dresser is directed to the tool for the detection of a distance, a conclusion is drawn on the geometry of the tool on the basis of distance values that were detected by the measurement element on the dressing to the tool, the tool is positioned such that a tooth flank is freely accessible in the longitudinal direction at the upper margin or lower margin of the tool, and the measurement element is traveled at a radial height of the outer diameter of the tool and at a tangential height of the tool margin, and the feed takes place from the starting point in small steps i) radially or ii) tangentially, with the tool being traveled i) tangentially or ii) radially after every step to contact the measurement element such that a discrete contour of the tooth flank is determined.

The tooth flank profile is required to determine the dressing amount that is necessary to produce the desired geometry from the grinding worm present. The tooth flanks should be sensed for this purpose. The tooth flanks at the tool margin are used for the sensing as a rule. The tool is positioned such that, starting from the margin, exactly one tooth flank can be sensed by the dresser; that is, the addendum has to be exactly half a pitch away from the tool margin (a different ratio with asymmetrical gearing).

The addendum positions can be determined by a preceding measurement process and are then known. The measurement unit is inwardly pivoted for the measurement process so that it is directed to the flank. The starting point of the measurement is the described position of the tool. The point measured at its distance is located at the radial height of the outer diameter of the tool (the grinding worm) and at the tangential height of the tool margin.

If a dresser is used as the measurement unit, the tool is radially fed in small steps from this point for the purpose of the sensing. The tool is brought tangentially into contact with the dresser after every step. Contact clearly takes place at a point of the dresser (contact point). The contact recognition can take place via impact sound. This routine is repeated for so long until the dedendum is contacted on the radial feed. The other tooth flank at the other end of the grinding worm is then sensed.

The measurement can equally take place via a step-wise tangential feed and via a sensing in the radial direction.

Provision can furthermore be made that the radial or tangential feed carried out in small steps is repeated for so long until the measurement element contacts the dedendum.

In accordance with an optionally further development of the present disclosure, the measurement element in the form of the dresser is moved tangentially over the tooth flank and the radial feed of the tool is carried out during this movement in dependence on a output of the distance measurement so that the measurement element travels over the flank contour in a contacting manner and delivers a quasi-continuous tooth flank contour.

A scanning measurement should take place to reduce the required measurement time for the detection of the tooth flank contour. The dresser is moved tangentially over the tooth flank. During this movement, the tool is fed to the dresser radially in dependence on the impact sound signal. The dresser thereby travels over the flank contour with the contact point. The movement process is determined and delivers a quasi-continuous tooth flank contour.

The regulation can, however, also be set such that a sensing of the surface results that tracks the tooth flank contour. The surface is stressed much less. This regulated sensing may be preferred since it combines the advantages of the two processes, namely the speed of the measurement and a small stress on the grinding tool, and is sufficient with respect to the measurement accuracy of the flank contour.

The maximum feed during the measurement is limited since dead times occur due to the regulation loop, whereby a high advance movement necessarily results in increased stress on the grinding tool (reaction and brake path). It can, however, occur due to the limitation that the dresser can no longer follow the flank contour from a specific steepness onward. The tangential spacing of the actual position of the V1 axis is therefore compared with the position of the last measurement value (contact position) in the regulated sensing and on too large a spacing, the V1 axis is stopped until contact again takes place. It is thereby ensured that a sufficiently exact measurement (a sufficient number of contact points over the tooth flank) takes place independently of the flank steepness. In the scanning measurement, the speed of the tangential movement can be correspondingly regulated in dependence on the impact sound signal to ensure the correct measurement of tooth flanks with small pressure angles.

Provision can be made in accordance with a further development of the method that the measurement element in the form of the dresser detects the distance using an impact sound device and/or using an evaluation of a following error of a dresser and/or using an evaluation of motor parameters for driving a dresser such as the current consumption, power consumption or motor voltage.

The present disclosure further comprises a gear cutting machine for the gear cutting of a workpiece that has a tool having a machining region in worm thread form and that has a measurement element for detecting a distance. The machine is characterized by the fact that it has a control unit that is configured to carry out one of the above-listed methods. The control unit may be coupled to various sensors for indicating parameters described herein. The described actions may be programmed into memory of the control unit and generate outputs, such as the various determinations as well as control actions to adjust an actuator of the gear cutting machine in response thereto.

BRIEF DESCRIPTION OF DRAWINGS

FIGS. 1, 2, 3, 4, and 6 are drawn to scale, although other relative dimensions may be used, if desired.

DETAILED DESCRIPTION

Figure 1:
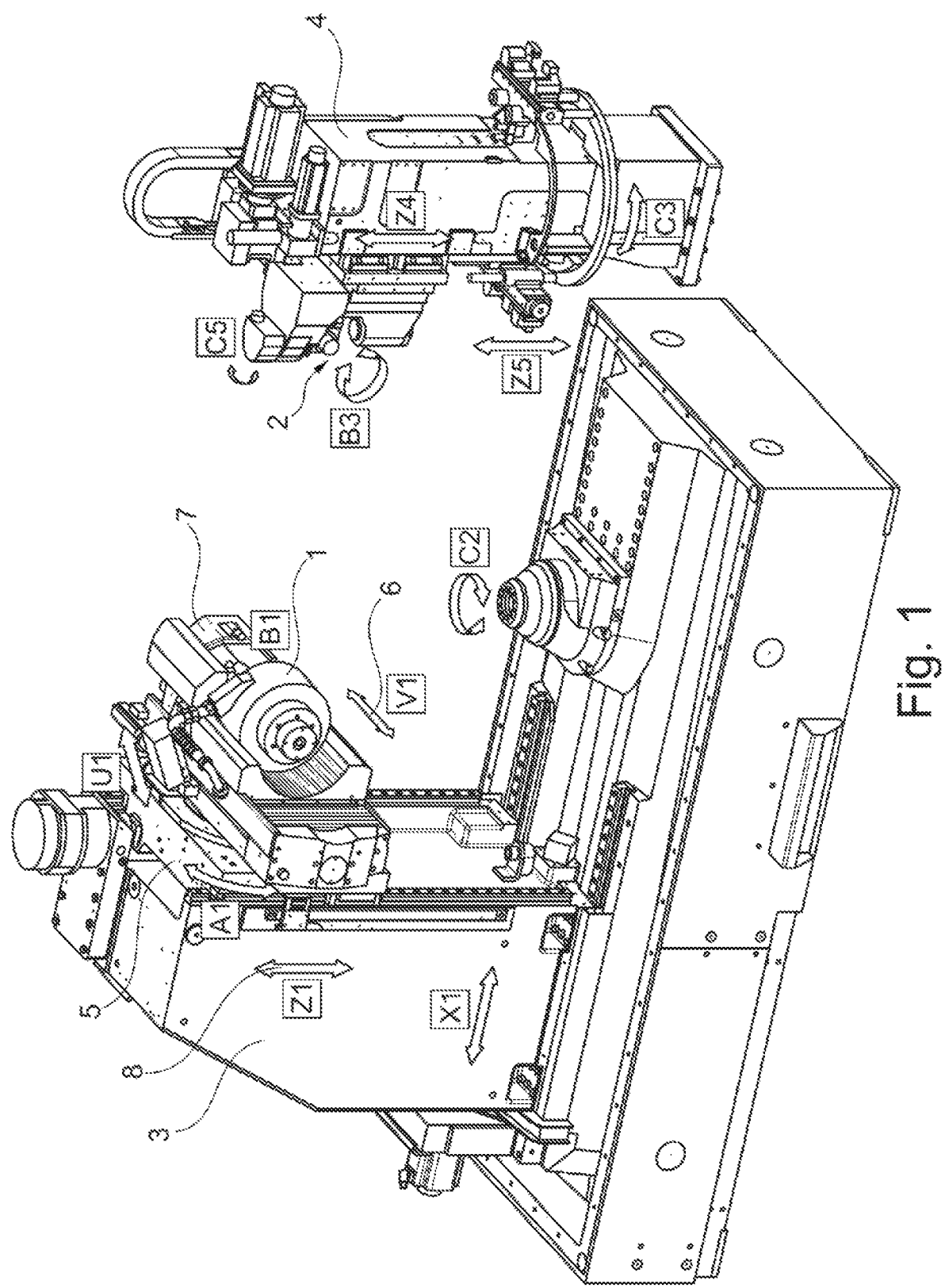
FIG. 1 shows a grinding apparatus in a perspective view.

FIG. 1 shows a grinding apparatus by which the claimed methods can be carried out in principle.

The axes of a grinding apparatus are drawn in FIG. 1 to improve understanding with respect to the functionality of the grinding apparatus. A machine column 3, and horizontally spaced apart therefrom, a counter-column 4 are shown in the left hand region of the gear cutting machine. A machining head 5 having a shift axis 6 (V1 axis) and a drive motor 7 for receiving a grinding tool 1 can be traveled vertically in the direction of a Z axis 8 along the machine column 3. An installation location 2 of the measurement unit provided in accordance with the present disclosure can lie in the region of the counter-column 4 of the gear cutting machine known per se.

If a dresser is used as the measurement unit, it is arranged in the region of reference numeral 2 and can inter alia be rotated about the axis B3. A different embodiment of the measurement unit can, however, also be arranged at the counter-column 4.

Both the column 3 and/or the counter-column 4 are arranged on travelable slides that permit a movement toward one another. It is thereby possible, for example, to feed the dresser to the grinding worm and to carry out a dressing process.

Figure 2:
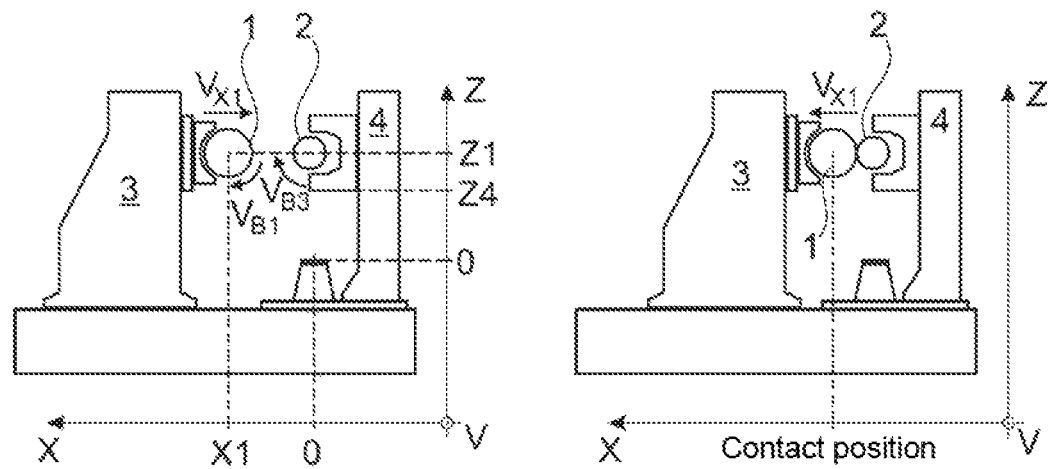
FIG. 2 shows a side view of the tool and of the measurement unit in two different positions.

FIG. 2 shows a side view in which the traveling of the machine column 3 with respect to the counter-column 4 can be easily recognized. The machine column is thus arranged remote from the counter-column 4 in the left hand representation, whereas the machine column 3 has been traveled toward the counter-column 4 in the right hand representation.

In the present case, a dresser is provided as the measurement unit and can detect the contact of the dresser 1 with the grinding worm 2 in different manners. FIG. 2 shows a state in which both the grinding worm 2 and the dresser 1, that can be a dressing wheel or a composite profile roller, can rotate in opposite senses to one another so that the jacket surface of the worm 2 can be determined on a contact of the dresser 1 with the worm 2.

It accordingly becomes clear from FIG. 2 that the dresser 2 and the worm 1 are movable toward one another in accordance with the axes shown in FIG. 1.

Figure 3:
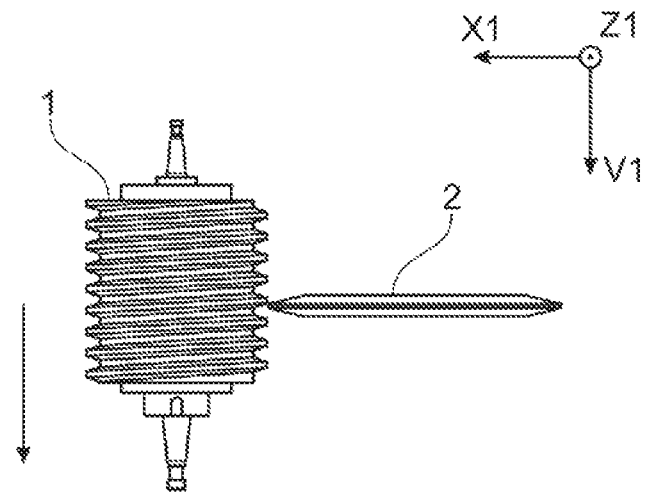
FIG. 3 shows a schematic representation of a grinding worm and of a dresser.

FIG. 3 is a diagram to explain the method of sensing the thread number of a worm 1.

The dresser 2 is positioned (inwardly pivoted with composite profile rollers) at the radial height of the jacket surface of the grinding worm 1, optionally into a thread space. The grinding worm now rotates by 720 degrees. The determination of the number of threads is, however, also possible on a rotation by 360 degrees or more or by a multiple of 360 degrees.

The impact sound signal is evaluated using a comparator, with each pulse passing over a threshold value as a rule corresponding to one thread of the grinding worm 1. If more than one revolution of the worm 1 is carried out in total, the grinding worm 1 is tracked radially by 20 µm after the first revolution to also receive reliable pulses in the impact sound signal on the second revolution. Two revolutions are measured in the present case to increase the likelihood of a correct detection. The determination is naturally also possible with only one revolution.

The number of threads results from the number of pulses. The measurement is checked in that the angular spacing between the teeth to be expected from the number of threads is compared with the measured or known angular spacings. If an irregularity is present, the measurement is repeated. For it is also possible with this measurement that an addendum is not yet contacted at every point at the height of the previously determined outer diameter of the grinding worm.

A detection of the number of threads via laser is likewise conceivable and covered by the present disclosure. The previously described methods work without a tool pivoted in corresponding to the lead angle of the grinding worm since the sensing takes place on the jacket surface. The methods can therefore be used with a completely unknown grinding worm. The only restriction for the present method is that the worm 1 may only have a homogeneously designed region.

Figure 4:
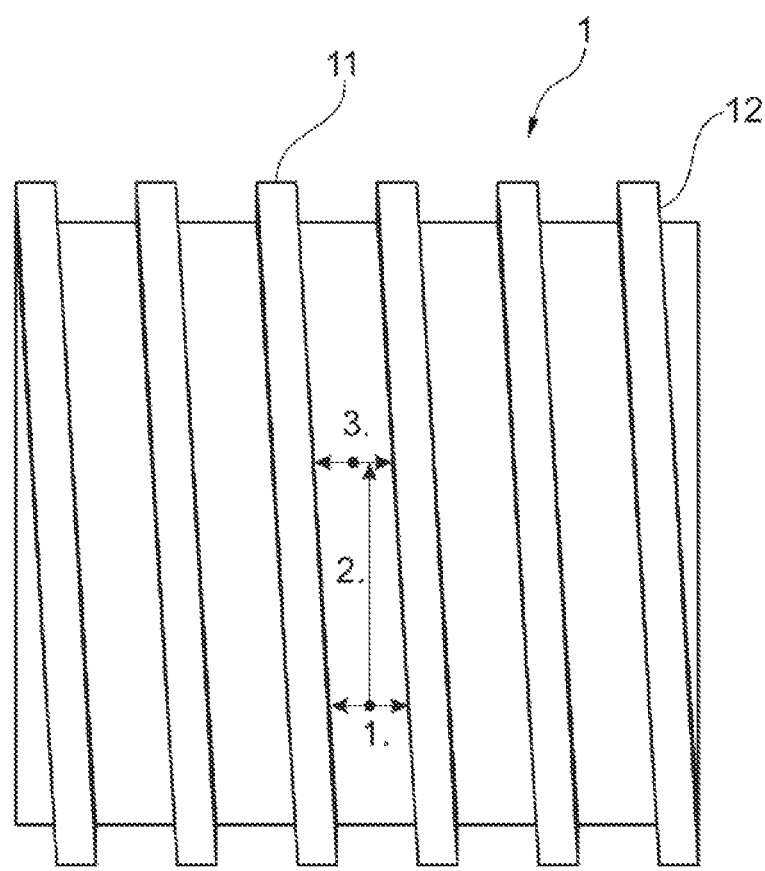
FIG. 4 shows a representation of a grinding worm with drawn travel paths of a dresser for the determination of a pitch direction.

FIG. 4 shows a representation for better understanding on the determination of the pitch direction of a thread of a grinding worm. A dresser is used as the measurement unit.

The maximum cutting depth (overlap depth) of the dresser 2 is first determined for the determination of the pitch direction of an unknown grinding worm 1. The grinding worm 1 is positioned for this purpose such that the dresser 2 is at the tangential height of a thread space center. At this height, the grinding worm 1 is radially brought into contact with the rotating dresser 2. The maximum cutting depth can then be determined from the contact position. The exact thread center position is then determined to e.g. 1/10 of the maximum cutting depth by traveling to the left flank and to the right flank 12 (meshing). The grinding worm 1 is then moved in the thread space by the dresser 2 via the B1 axis. A check is made by means of impact sound whether this is done without a collision, otherwise the movement is aborted. At the new position, the dresser 2 is again centered by traveling to the left flank and to the right thread flank 12. There is a tangential offset between the two obtained centering positions that permits a conclusion on the pitch direction of the grinding worm 1.

If the determination of the pitch direction is carried out by means of an optical measurement unit, the contact with the tooth flank can be replaced by the determination of a specific distance value of which it is known that it lies on the tooth flank.

Figure 5:
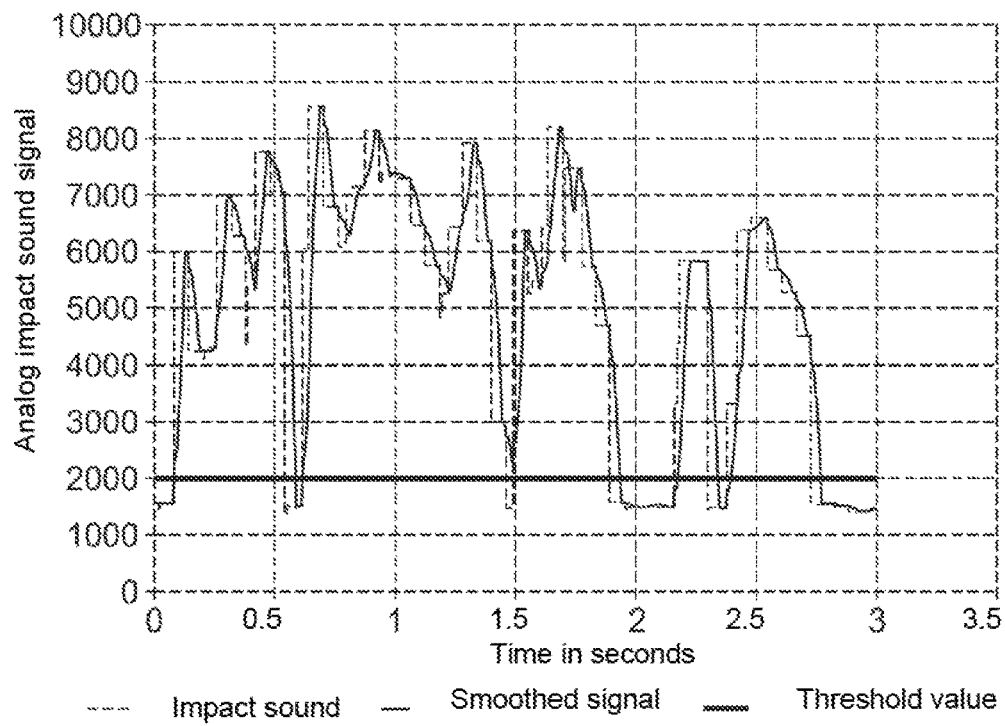
FIG. 5 shows a diagram of an impact sound signal on a chip determination at the addendum.

FIG. 5 shows a diagram that has been obtained on a gear-coupled traveling over of the addendum of the grinding worm 1. A dresser 2 having an impact sound device is used as the measurement unit. Different embodiments of the measurement unit are, however, also covered by the present disclosure and produce similar results as those shown in FIG. 5.

The chip monitoring is of high importance since the machining of a workpiece with a damaged tool can produce insufficient results.

It can thus be the case on the setting up of a machine with a used grinding worm 1 that the latter is damaged (e.g. by storage, transport, prior machining). In this case, the defective regions have to be taken into account or have to be eliminated by the dressing. The addenda 11 are traveled over with gear coupling by the dresser 2 for the recognition of such defects. With an undamaged grinding worm 1, an impact sound signal is continuously produced. If there is a chip at one point, the dresser has no contact at this point and no impact sound is generated. The impact sound signal accordingly drops. The impact sound signal is evaluated by a comparator during the process. When the comparator switches, the tangential positions and the angular positions of the grinding worm are stored. These positions then correspond to the starts and ends of defective regions of the grinding worm.

In the present case, defective regions were detected at the addenda 11 of the worm 1 in the range of 0 seconds, 0.6 seconds, 2 seconds, 2.4 seconds, and 2.8 seconds.

The sensitivity with respect to chips can be influenced by a signal smoothing or by the speed of the measurement, as has been shown in FIG. 5 by the lighter line in comparison with the darker line.

Figure 6:
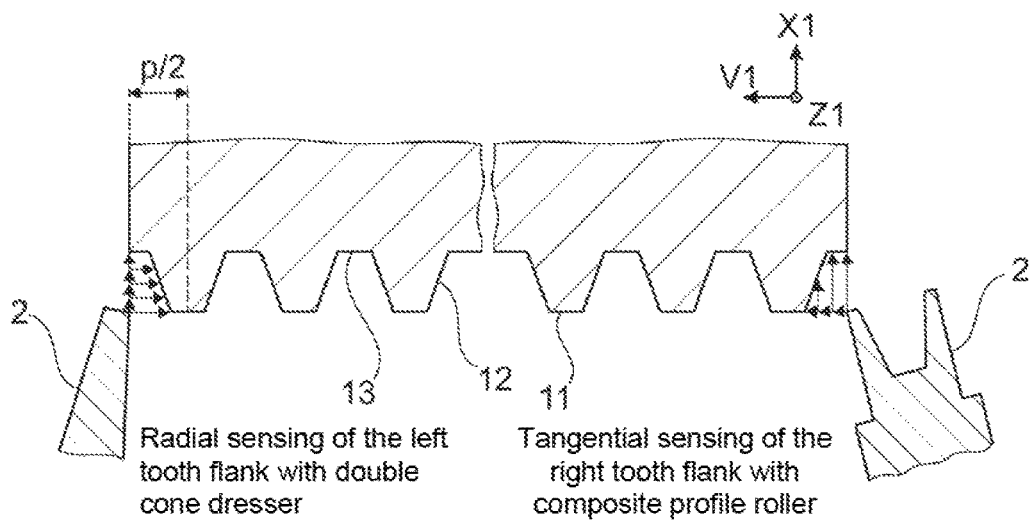
FIG. 6 shows a representation of a measurement routine of a radial tooth flank sensing.

FIG. 6 shows a representation for a possible measurement routine for the radial tooth flank sensing on a use of a dresser as the measurement unit.

The tooth flank contour is required to determine the dressing amount that is necessary to produce the desired geometry from the grinding worm 1 present. The tooth flanks 12 should be sensed for this purpose. The tooth flanks 12 at the tool margin are used for the sensing. The tool 1 is positioned such that, starting from the margin, exactly one tooth flank 12 can be sensed by the dresser 2; that is, the addendum 11 has to be exactly half a pitch away from the tool margin (a different ratio with asymmetrical gearing).

The addendum positions can be determined by a previously carried out method or are known by an input of the operator of the machine. The dresser 2 is inwardly pivoted for the measurement process so that it contacts the flank 12 only at one point. The starting point of the measurement is the described position of the grinding worm 1. The contact point of the dresser 2 is located at the radial height of the outer diameter of the grinding worm 1 and at the tangential height of the tool margin. The tool 1 is radially fed from this point in small steps for the purpose of the sensing. The tool 1 is brought tangentially into contact with the dresser 2 after every step. Contact clearly takes place at a point of the dresser 2 (contact point). The contact recognition takes place via impact sound. This routine is repeated for so long until the dedendum 13 is contacted on the radial feed. The other tooth flank 12 at the other end of the grinding worm 1 is then sensed. The measurement can equally take place via a step-wise tangential feed and via a sensing in the radial direction. The method delivers a discrete contour of the tooth flanks 12. The pressure angle can be determined from this, for example. However, only the tooth flank 12 can be sensed. As can be seen from the illustration (arrows), a different contact point of the dresser 2 is provided in the inwardly pivoted state on the sensing of the dedendum 13 (or of the addendum 11). Since the contour of the dresser 2 is not exactly defined at the head, the dresser 2 cannot be pivoted as desired and the contact points recalculated.

The contact recognition can likewise take place via the following error or via the observation of motor parameters.

Figure 7:
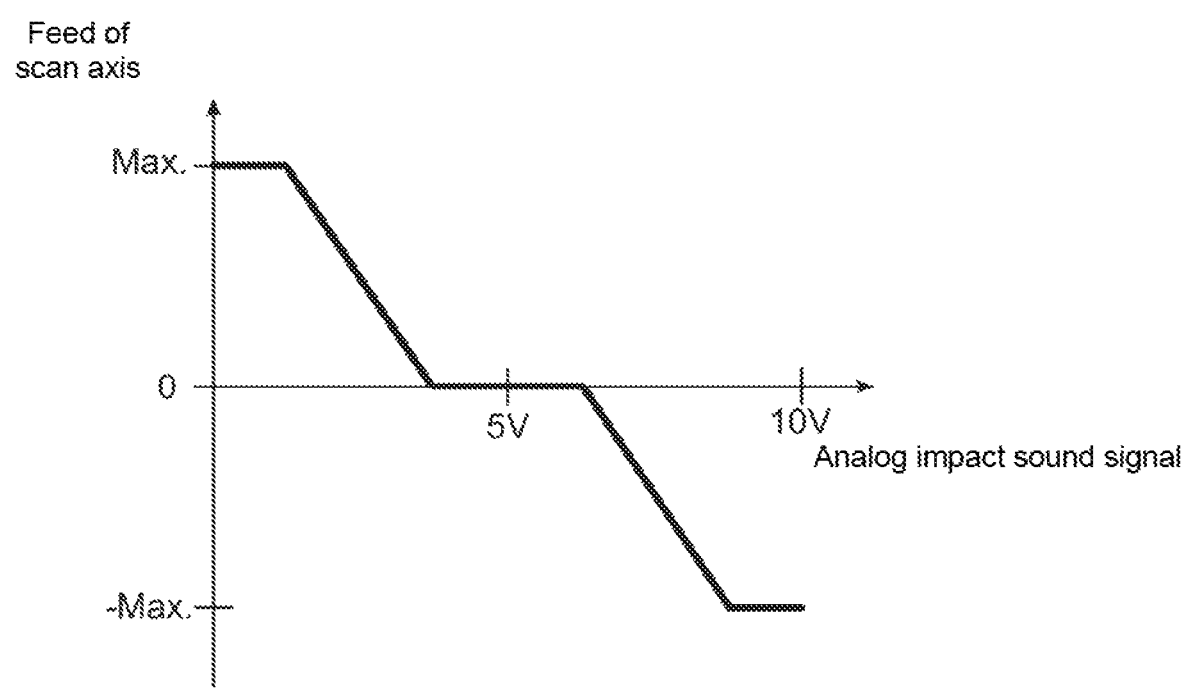
FIG. 7 shows a representation of a regulation of the feed of the scan axis in dependence on the analog impact sound signal.

FIG. 7 shows a regulation of the feed of the scan axis on the use of a dresser as the measurement unit in which the feed is carried out in dependence on the analog impact sound signal.

A scanning measurement should take place to reduce the required measurement time for the detection of the tooth flank contour. The dresser 2 is moved tangentially over the tooth flank. During this movement, the tool 1 is fed to the dresser 2 radially in dependence on the impact sound signal. The dresser 2 thereby travels over the flank contour with the contact point. The movement process is determined and delivers a quasi-continuous tooth flank contour.

The regulation can, however, also be set such that a sensing of the surface results that tracks the tooth flank contour. The surface is stressed much less. This regulated sensing is of advantage with respect to the speed of the measurement and a small stress on the grinding tool. It is furthermore sufficient with respect to the measurement accuracy of the flank contour.

The maximum feed during the measurement is limited since dead times occur due to the regulation loop, whereby a high advance movement necessarily results in increased stress on the grinding tool (reaction and brake path). It can, however, occur due to the limitation that the dresser 2 can no longer follow the flank contour from a specific steepness onward. Provision can therefore be made that the tangential spacing of the actual position of the V1 axis is compared with the position of the last measurement value (contact position) in the regulated sensing and on too large a spacing, the V1 axis is stopped until contact again takes place. It is thereby ensured that a sufficiently exact measurement (a sufficient number of contact points over the tooth flank) takes place independently of the flank steepness.

In the scanning measurement, the speed of the tangential movement can be correspondingly regulated in dependence on the impact sound signal to ensure the correct measurement of tooth flanks with small pressure angles.

The invention claimed is:

1. A method for the automatic determination of the geometrical dimensions of a tool having a machining region in worm thread form , wherein in the method include that:
   a measurement element is directed to the tool for the detection of a distance;
   the tool is set into rotation with respect to the measurement element; and
   a conclusion is drawn on the geometrical dimensions of the tool on the basis of distance values that were detected by the measurement element during the rotation of the tool.

2. The method in accordance with claim 1, wherein further in the method:
   the detected distance values are compared with a specified threshold value with a rigid arrangement of the tool along its axis of rotation and on a rotation of the tool by at least 360°; and
   the number of threads of the tool is determined on the basis of the distance values compared with the threshold value.

3. The method in accordance with claim 1, wherein
   the measurement element is positioned centrally with respect to a thread width of the tool;
   the tool is set into rotation along the axis of rotation with a rigid arrangement and is stopped such that the measurement element arranged rigidly during the rotation is continuously oriented on a thread of the tool with its distance measurement during the rotation carried out and does not leave it;

the measurement element is again positioned centrally to the thread width of the tool at this new position of the tool; and the pitch direction of the thread of the tool is determined on the basis of a shift of the two centers of the thread width before and after the rotation, with the measurement element being aligned substantially perpendicular to the axis of rotation of the tool during the above method steps.

4. The method in accordance with claim 1, wherein the measurement element is directed to an addendum or to a tooth flank of the tool;

the rotation of the tool takes place with gear coupling to the measurement element, wherein the tool is correspondingly moved tangentially along its axis of rotation in agreement with a lead angle of a thread of the tool; and the state and/or a contour of the addendum or of the tooth flank is determined on the basis of distance values detected by the measurement element, and a chip at the addendum or at the tooth flank is determined at specific tangential positions and angular positions of the tool.

5. The method in accordance with claim 1, wherein the results are checked on the determination of the geometry of the tool in that:

the measurement unit is aligned to a center of a thread of the tool;

the tool is traveled over with gear coupling to the measurement unit while taking account of the values to be checked; and the distance value detected during the travel and/or the position of the measurement unit after the travel with respect to the center of the thread of the tool enables a conclusion on the correctness of the results on the determination of the geometry of the tool.

6. The method in accordance with claim 1, wherein the measurement unit is realized by an optical measurement unit such as a laser distance measurement device, by an acoustic measurement unit such as a dresser/composite profile roller having a sound impact device and/or by a physical measurement unit such as an evaluation of a following error of a dresser and/or an evaluation of motor parameters for driving a dresser such as current consumption, power consumption, or motor voltage.

7. The method in accordance with claim 1, wherein, on the realization of the measurement unit by a dresser having an impact sound device, the dresser, generates a change in the impact sound detectable by the impact sound device when the dresser impacts the tool in a state rotating with respect to the tool so that a minimal distance from the dresser can be determined.

8. The method in accordance with claim 1, wherein the following error is used with the measurement unit through a dresser, to determine a minimal distance of the dresser and the tool since there is a delay due to the friction on a coming together of the rotating dresser and the tool and since a difference can be detected in a comparison of the desired value and the actual value such that the contact of the dresser and the tool can be determined.

9. The method in accordance with claim 1, wherein with a measurement unit through a dresser, the detection of motor parameters of a drive for rotating the dresser or the tool is used to determine a minimal distance of the dresser and the tool since a friction is produced on a contact of the dresser and the tool and the additional load torque thereby produced is reflected in the motor parameters, in particular in a change in the current consumption, power consumption and/or motor voltage.

10. The method in accordance with claim 1, wherein the tool having a machining region in worm thread form includes a grinding worm.

11. The method in accordance with claim 9 wherein the dresser is a dressing wheel or a composite profile roller.

12. The method in accordance with claim 5 wherein the tool is traveled over with gear coupling to the measurement unit while taking account of the values to be checked along its complete length.

13. A method for the determination of the geometry of a tool having a machining region in worm thread form, wherein in the method:

a measurement element in the form of a dresser or of a composite profile roller is directed onto the tool for the detection of a distance;

a conclusion is drawn on the geometry of the tool on the basis of distance values that were detected by the measurement element on the direction onto the tool;

the tool is positioned such that a tooth flank is freely accessible in the longitudinal direction at the upper margin or lower margin of the tool, and the measurement element (2 is traveled at the radial height of the outer diameter of the tool and at the tangential height of the tool margin and, starting from the starting point, the feed takes place in small steps i) radially or ii) tangentially, with the tool being traveled i) tangentially or ii) radially after every step to contact the measurement element so that a discrete contour of the tooth flanks is determined.

14. The method in accordance with claim 13, wherein the radial or tangential feed carried out in small steps is repeated for so long until the measurement element contacts the dedendum.

15. The method in accordance with claim 14, wherein the measurement element in the form of the dresser is moved tangentially over the tooth flank and the radial feed of the tool is carried out during this movement in dependence on an output of the distance measurement so that the measurement element travels over the flank contour in a contacting manner and delivers a quasi-continuous tooth flank contour.

16. The method in accordance with claim 15, wherein the measurement element in the form of the dresser detects the distance using an impact sound device and/or using an evaluation of a following error of a dresser and/or using an evaluation of motor parameters for driving a dresser such as the current consumption, power consumption or motor voltage.

17. A gear cutting machine for the gear cutting of a workpiece comprising a tool having a machining region in worm thread form and a measurement element for detecting a distance, characterized in that the gear cutting machine has a control unit that is configured to carry out one the methods of claim 1.

* * * * *